May 24, 1927.   G. M. MESSINGER   1,630,131
MINNOW BOX
Filed Nov. 4, 1925
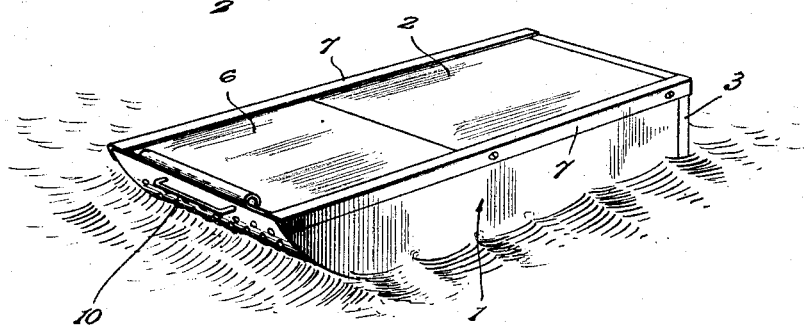
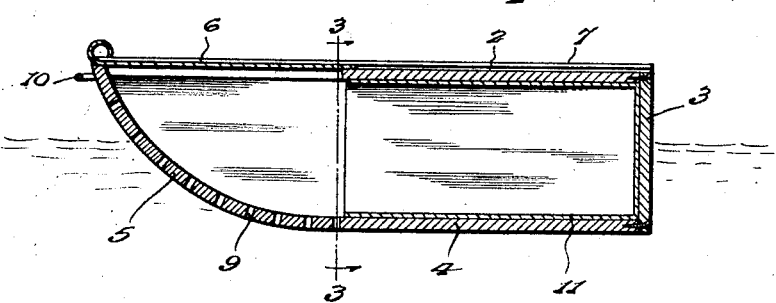
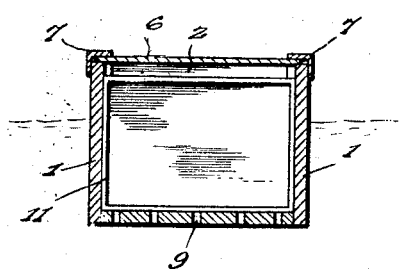
Inventor
G. M. Messinger.
By Lacey & Lacey, Attorneys Patented May 24, 1927.

1,630,131

UNITED STATES PATENT OFFICE.

GEORGE M. MESSINGER, OF MORGANZA, PENNSYLVANIA, ASSIGNOR OF ONE-HALF TO HARRY A. ROAT, OF MANCHESTER, NEW YORK.

MINNOW BOX.

Application filed November 4, 1925. Serial No. 66,784.

The invention relates to a container for bait, such as minnows, which admits of the angler having free use of both hands when baiting the line and which provides for a change of water and air, both essential to the welfare of the minnows, and which will float nearly submerged.

The invention aims to provide a minnow container of peculiar shape adapted to float partly submerged and to be drawn through the water and which is exceptionally convenient for handling while seining for minnows and for shore wading, or boat fishing, and which may be disposed in upright position when transporting and carrying.

While the drawings illustrate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which,—

Figure 1 is a perspective view of a minnow box embodying the invention,

Figure 2 is a vertical central longitudinal sectional view of the box, and

Figure 3 is a transverse sectional view on the line 3—3 of Figure 2 looking towards the rear as designated by the arrows.

Corresponding and like parts are referred to in the following description and indicated in the several views of the drawings by like reference characters.

The box, preferably constructed of wood, is elongated and comprises spaced parallel sides 1, a top 2, an end 3 and a bottom 4, which has an end portion curved upwardly and forwardly as indicated at 5 and joining the top 2. An opening is formed in the front portion of the top 2 opposite the curved portion 5 of the bottom 4 and this opening is closed by means of a cover 6 which slides in guides 7 attached to the sides 1 of the box. These guides consist of angle strips attached by one flange to the sides of the box and having the other flange overlying the top 2 and spaced therefrom to snugly receive the sliding cover 6. The curved portion 5 of the bottom 4 is perforated or provided with a plurality of openings 9 for the admission of air and water which are essential to the welfare of the fish, water entering when the box is placed in a stream or other body of water. A loop 10 is provided at the forward end of the box preferably in the plane of the top 2 and constitutes a handle for convenience of carrying the box and also functions as an eye for the attachment of a tow line, which is attached to the belt when wading to sein minnows, or fish, or to the shore when fishing from land, or to the boat when fishing from a boat, or for other purpose which will readily suggest itself to meet the requirements of the angler.

It is observed that the box presents the appearance of a flat bottom boat or scow and it is preferably of wood which has been found to be a better insulator than metal, thereby preserving the minnows for a comparatively long time when traveling from place to place. The box is constructed so as to float almost submerged therefore it need not be held or supported in any way when baiting the hook and as a result both hands of the fisherman are free when placing the minnows upon the hook.

The rear portion of the box is enclosed by imperforate walls, so as to retain water when the box is stood on end. When the box is carried by the loop 10 as a handle, it assumes an upright position and contains sufficient water to maintain the bait in prime condition. When the box is placed in the water the latter passes through the openings 9 thereby assuring a constant change of the water so long as the box remains in the water, and when lifted or stood on end the lower or rear portion of the box beyond the door opening and the openings 9 retains sufficient water to insure the welfare of the fish.

A metal lining 11 occupies that portion of the box in the rear of the opening in the top and the perforate portion of the bottom and is removable to be replaced when necessary. The end 3 of the box is readily detachable to admit of placing the lining 11 in position or removing it from the box as required.

Having thus described the invention, what I claim is:

1. A minnow box of elongated form having the forward portion of its bottom deflected upwardly and forwardly and provided with a plurality of openings and having a door controlled opening in its top opposite the deflected end portion of the bottom, the rear portion of the box having its walls imperforate to retain water when the box is arranged in upright position.

2. A minnow box of elongated form having the forward portion of its bottom curved upwardly and forwardly and provided with a plurality of openings and having a door controlled opening in its top opposite the curved end portion of the bottom, the rear portion of the box having its walls imperforate to retain water when the box is arranged in upright position, and a loop at the front end of the box about in the plane of the top thereof to form a handle and an eye for a tow line.

3. A minnow box comprising spaced sides, a flat bottom having its front portion curved upwardly and forwardly and provided with a plurality of openings, a flat top having an opening in its front portion opposite the perforated curved end portion of the bottom and a straight end adapted to support the box in upright position, a cover closing the opening in the top, and a loop at the front of the box about in line with the top thereof.

4. A minnow box of wood, of oblong rectangular outline, having the front portion of its bottom curved upwardly and forwardly and perforated, and having an opening in the top opposite the curved perforated portion of the bottom, the rear end being detachable and flat to support the box in upright position, a cover for closing the opening in the top, a loop at the front end of the box forming a handle and attaching eye, and a metal lining occupying that portion of the box in the rear of the opening in the top and the perforated portion of the bottom.

In testimony whereof I affix my signature.

GEO. M. MESSINGER. [L. S.]